J. A. STEWART.
HOOD FASTENER.
APPLICATION FILED JULY 31, 1919.

1,358,123.

Patented Nov. 9, 1920.

WITNESS

INVENTOR
JAMES A. STEWART
BY
ATTORNEY

UNITED STATES PATENT OFFICE.

JAMES A. STEWART, OF OAKLAND, CALIFORNIA, ASSIGNOR TO STEWART MANUFACTURING COMPANY, OF OAKLAND, CALIFORNIA, A CORPORATION OF CALIFORNIA.

HOOD-FASTENER.

1,358,123.  Specification of Letters Patent.  Patented Nov. 9, 1920.

Application filed July 31, 1919. Serial No. 314,562.

*To all whom it may concern:*

Be it known that I, JAMES A. STEWART, a citizen of the United States, and a resident of the city of Oakland, county of Alameda, State of California, have made a new and useful invention—to wit, Improvements in Hood-Fasteners; and I do hereby declare the following to be a full, clear, concise, and exact description of the same.

This invention relates to an improvement in hood fasteners commonly employed in retaining automobile hoods in the closed position and preventing rattle thereof.

One of the objects of the invention is to provide an improved hook which can be quickly attached for holding the hood of an automobile closed, which hook will be reasonable as to the cost of manufacture, applicable to any car, either new or now upon the market, and a hook which may be adjusted up or down a bolt to engage hook with a bracket as the said bracket may vary in height.

Another object of the invention is to produce a hook which will hold two parts together yieldingly, and at the same time allow an adjustment of the tensioning means so that the required tension may be secured as best suits the user.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

Referring to the drawings.

Figure 2:
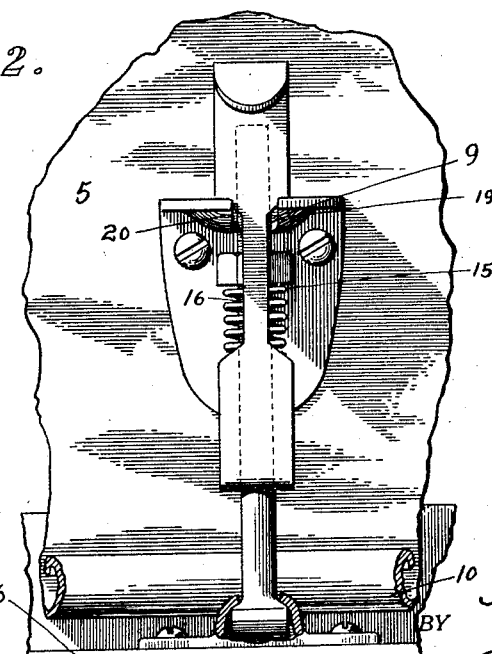
Fig. 2 is a side elevation of my improved hook attached to an automobile.

Referring to the drawings more in detail, the numeral 5 designates the hood covering the engine of a car, and the numeral 6 refers to the body member adjacent said hood. Attached to the member 5 is a bracket 7 having a depressed portion 8 in the horizontal portion of said bracket. This bracket is slotted to provide access for the clamping hook, and is clearly shown in Fig. 2 at 9.

Figure 1:
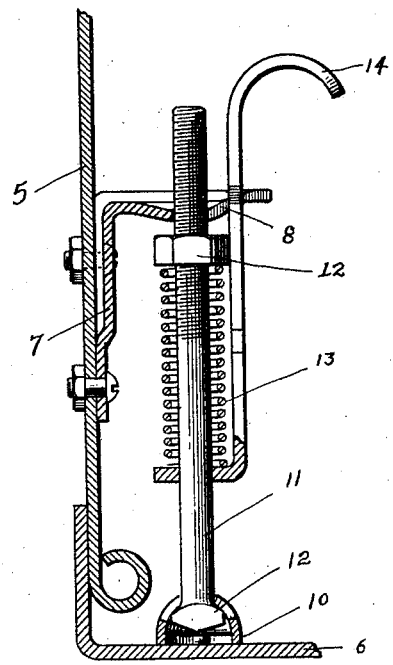
Figure 1 is a side elevation of my improved hook, and showing the parts attached thereto in cross section.

To the member 6 is attached a socket member 10, which socket member carries the lower end of a threaded bolt 11. This lower end may be arcuate in shape as shown at 12, or may be a ball, the idea being to provide a bolt which will have a limited free movement within said socket member. Upon the threaded bolt 11, I have placed a nut 12 which retains upon the bolt a spring 13 and a hook member 14. This hook member is slidable upon said bolt, and comprises a narrow body portion formed by the cut away portions 15 and 16 which leaves shoulders or projections at 19 and 20, which are adapted to ride upon the upper surface of the depressed portion 8 and the bracket 7. These shoulders or projections are tightly held in frictional contact with said bracket through the medium of the spring 13 which is under compression when said hook 14 is in the position shown in Fig. 1.

Should it be desirous to open the hood of the engine, the hook 14 is lifted which compresses the spring 13 and withdraws the shoulders or projections from contact with the bracket, at which time the fastener as a whole may be swung away from said bracket through its loose connection in the socket 10.

By turning downwardly on the nut 12, the spring 13 will be compressed, which will draw the hook 14 more tightly against the bracket 7.

When it is desired to relieve the tension, the nut 12 will be screwed upwardly relieving some of the tension.

It will be seen that I have provided a structure which can accommodate any requirement for a tension hook.

This device was designed for use on Chevrolet automobiles, and to be substituted for the wing nut construction that is standard equipment now in use on said cars.

Having thus described my invention, what I claim as new and desire to secure by Letters Patent of the United States is:

A device of the character described, comprising a fixed support, having a slot therein, adapted to be placed on the hood of an automobile; a bolt member, swivelly mounted, relative to said fixed member on a stationary part of an automobile and adapted to enter the slot of said fixed support for a predetermined distance; a support engaging arm, comprising a flat, metal member having a portion of the body thereof reduced to engage the slot of the fixed support; shoulders adjacent the constricted portion on opposite sides thereof adapted to engage the upper surface of the fixed support; an outwardly extending flange integrally formed on said arm for disengaging the same from the fixed support; an oppositely extending projection on the opposite end thereof slidably mounted on said bolt member; a tension spring bearing against said projection; means on said bolt for regulating the tension of said spring.

In testimony whereof, I have hereunto set my hand at San Francisco, California, this 26th day of April 1919.

JAMES A. STEWART.

In presence of—
  A. J. HENRY.